United States Patent
Beer et al.

(10) Patent No.: US 11,847,648 B2
(45) Date of Patent: Dec. 19, 2023

(54) SECURE DIGITAL SAFE DEPOSIT BOXES AND METHODS OF USE

(71) Applicant: JPMORGAN CHASE BANK, N.A., New York, NY (US)

(72) Inventors: Allison Beer, Bronxville, NY (US); Howard Spector, Woolwich, NJ (US); Seth M. Goldkrantz, Phoenix, AZ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/808,276

(22) Filed: Jun. 22, 2022

(65) Prior Publication Data

US 2022/0327535 A1   Oct. 13, 2022

Related U.S. Application Data

(62) Division of application No. 16/433,537, filed on Jun. 6, 2019, now Pat. No. 11,397,948.

(Continued)

(51) Int. Cl.
| | |
|---|---|
| *G06Q 40/00* | (2023.01) |
| *G06Q 20/40* | (2012.01) |

(Continued)

(52) U.S. Cl.
CPC ......... *G06Q 20/40* (2013.01); *G06Q 20/3821* (2013.01); *G07F 17/12* (2013.01)

(58) Field of Classification Search
CPC .... G06Q 40/00; G06Q 20/40; G06Q 20/3821; G06F 17/12
See application file for complete search history.

(56) References Cited

U.S. PATENT DOCUMENTS

| | | |
|---|---|---|
| 6,954,753 B1 | 10/2005 | Jeran |
| 8,327,450 B2 | 12/2012 | Clement et al. |

(Continued)

FOREIGN PATENT DOCUMENTS

| | | | |
|---|---|---|---|
| TW | 557879 U | * | 4/2018 |

OTHER PUBLICATIONS

Full Reserve Banking C Van Dixhoorn—Sustainable Finance Lab. [Retrieved . . . , 2013—sustainablefinancelab.nl (Year: 2013).*

(Continued)

*Primary Examiner* — Lalita M Hamilton
(74) *Attorney, Agent, or Firm* — GREENBERG TRAURIG LLP

(57) ABSTRACT

Systems and methods for secure digital safe deposit boxes are disclosed. In one embodiment, a method for using a secure digital safe deposit box may include: (1) receiving permission from a customer to access internal and third party financial or confidential information for the customer; (2) retrieving the internal financial or confidential information for the customer; (3) receiving account information accounts held with a third party that holds financial or confidential information; (4) jointly authenticating the customer with the third party; (5) receiving the third party financial or confidential information for the customer from the third party; (6) receiving permission to share at least some of the internal or third party financial or confidential information for the customer with an external party; and (7) sharing the internal or third party financial or confidential information for the customer with the external party in accordance with the permission.

20 Claims, 3 Drawing Sheets

Related U.S. Application Data

(60) Provisional application No. 62/681,173, filed on Jun. 6, 2018.

(51) Int. Cl.
  *G06Q 20/38* (2012.01)
  *G07F 17/12* (2006.01)

(56) References Cited

U.S. PATENT DOCUMENTS

| | | |
|---|---|---|
| 10,530,580 B1 | 1/2020 | Walker |
| 10,715,497 B1 | 7/2020 | Maeng |
| 2006/0085344 A1 | 4/2006 | Grim, III |
| 2007/0282678 A1 | 12/2007 | Dendi et al. |
| 2009/0271321 A1 | 10/2009 | Stafford |
| 2012/0173397 A1 | 7/2012 | Elwell et al. |
| 2016/0232546 A1* | 8/2016 | Ranft ................. G06Q 30/0206 |

OTHER PUBLICATIONS

International Search Report, dated Oct. 7, 2019, from corresponding International Application No. PCT/US2019/35766.
Written Opinion of the International Searching Authority, dated Oct. 7, 2019, from corresponding International Application No. PCT/US2019/35766.
Extended European Search Report, dated Feb. 14, 2022, from corresponding European Patent Application No. 19814509.6.
Pertiweiser, Dr. Markus; "For the banking of the future—Deutsche Bank's Digital Factory", Deutsche Bank Private, Wealth & Commercial Clients, Sep. 29, 2016.

* cited by examiner

SECURE DIGITAL SAFE DEPOSIT BOXES AND METHODS OF USE

RELATED APPLICATIONS

This application is a Divisional of U.S. patent application Ser. No. 16/433,537, now U.S. Pat. No. 11,397,948, filed Jun. 6, 2019, which claims the benefit and priority of U.S. Provisional Patent Application Ser. No. 62/681,173, filed Jun. 6, 2018, the disclosures of each of which is hereby incorporated, by reference, in its entirety.

This application claims the benefit and priority of U.S. Patent Application Ser. No. 62/681,173, filed Jun. 6, 2018, the disclosure of which is hereby incorporated, by reference, in its entirety.

BACKGROUND OF THE INVENTION

1. Field of the Invention

The present disclosure generally relates to secure digital safe deposit boxes and methods of use.

2. Description of the Related Art

There are many uses for an individual's personal financial information, which may include personally identifiable information. This information may be used to target an individual for certain offers, decision the individual for offers, etc. Usually, this information is not held by a single party; while a financial institution may have access to their customers' financial information, other third parties may maintain additional financial information separately. Without having most of this information, it is difficult to get a complete picture of an individual's financial situation.

SUMMARY OF THE INVENTION

Systems and methods for secure digital safe deposit boxes are disclosed. In one embodiment, in an information processing apparatus comprising at least one computer processor, a method for using a secure digital safe deposit box may include: (1) receiving permission from a customer to access internal and third party financial or confidential information for the customer; (2) retrieving the internal financial or confidential information for the customer; (3) receiving account information accounts held with a third party that holds financial or confidential information; (4) jointly authenticating the customer with the third party; (5) receiving the third party financial or confidential information for the customer from the third party; (6) receiving permission to share at least some of the internal or third party financial or confidential information for the customer with an external party; and (7) sharing the internal or third party financial or confidential information for the customer with the external party in accordance with the permission.

In one embodiment, the third party financial or confidential information may be received from the third party using at least one of an API, HTML screen scraping, file transfer, and real-time feed.

In one embodiment, the internal and third party financial or confidential information may be encrypted and stored as raw data.

In one embodiment, the internal financial or confidential information and the third party financial or confidential information may be stored separately.

In one embodiment, internal financial or confidential information and the third party financial or confidential information for a plurality of customers are aggregated.

In one embodiment, the method may further include anonymizing the internal and third party financial or confidential information.

In one embodiment, the method may further include providing a benefit to the customer in exchange for sharing the internal or third party financial or confidential information with the external party.

In one embodiment, the benefit may include the issuance of reward points.

In one embodiment, the financial or confidential information may include personally identifiable information.

In one embodiment, the shared internal or third party financial or confidential information may be associated with at least one restriction.

In one embodiment, the shared internal or third party financial or confidential information may expire.

According to another embodiment, in an information processing apparatus comprising at least one computer processor, a method for using customer data with a digital safe deposit box may include: (1) receiving, from a customer, an application for a product or service; (2) retrieving internal financial or confidential information from an internal data source; (3) receiving account information accounts held with a third party that holds financial or confidential information; (4) jointly authenticating the customer with the third party; (5) receiving the third party financial or confidential information for the customer from the third party; (6) generating a simple score based on the internal and third party financial or confidential information using at least one algorithm; and (7) decisioning the customer based on the internal score.

In one embodiment, the financial or confidential information may include personally identifiable information.

In one embodiment, the method may further include adjusting the algorithm based on the internal and third party financial or confidential information and financial or confidential information from at least one similarly-situated customer;

In one embodiment, the method may further include: anonymizing the internal and third party financial or confidential information; and providing the anonymized internal and third party financial or confidential information to an external party. The internal and third party financial or confidential information may be anonymized by at least one of tokenizing, removing, or masking PII data.

In one embodiment, the method may further include aggregating internal and third party financial or confidential information for a plurality of customers; and providing the aggregated internal and third party financial or confidential for the plurality of customers information to an external party.

In one embodiment, the method may further include identifying at least one product or service to offer the customer based on the internal and third party financial or confidential for the customer.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to secure digital safe boxes, and the use thereof. For example, embodiments may facilitate access to customers' financial and/or other confidential or personal data that may already exist within a financial institution's systems, as well as other information that may be maintained by third parties. This data may be used, for example, to target or decision customers for products. Machine learning, and rules-based decisioning may be used to collect data, target products, and/or decision customers.

In embodiments, the financial institution may provide a digital safe deposit box that allows customers to securely store and grant access to their financial and other confidential or personal data. In one embodiment, the data may include personal identifiable data, or PII.

Figure 1:
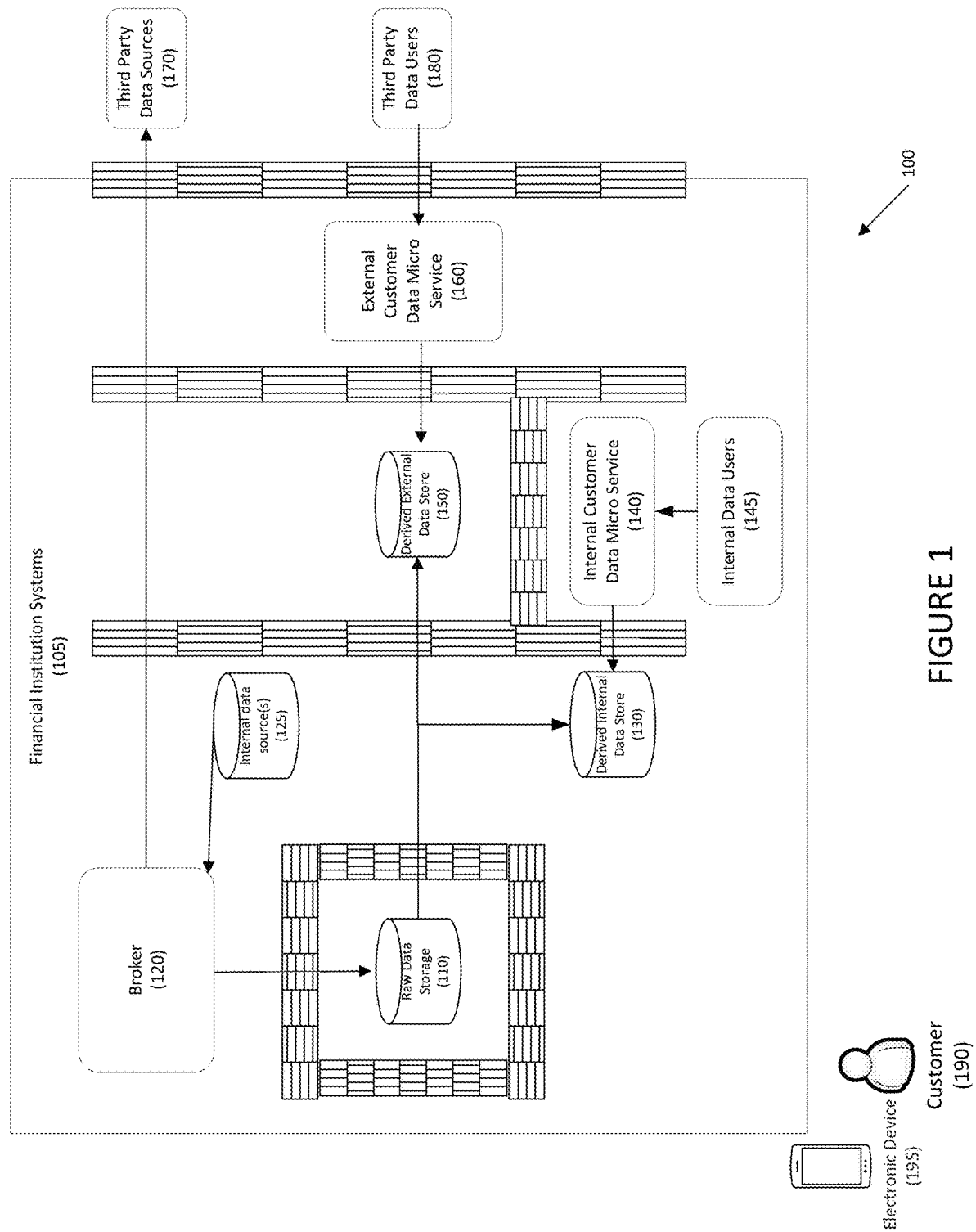
FIG. 1 depicts a secure digital safe deposit box system according to one embodiment.

Referring to FIG. 1, a secure digital safe box system is provided according to one embodiment. Secure digital safe box system 100 may include financial institution systems 105, which may include raw data storage 110, broker 120, derived internal data 130, internal customer data microservice 140, derived external data 150, and external customer data microservice 160. Broker 120 may receive data from third party data source 170, and third-party data users 180 may access derived external data 150 via external customer data microservice 150.

Customer 190 may access a financial institution's online portal, or may interact with a branch employee. Customer 190 may grant permission to the financial institution to access the customer's financial or confidential information.

In one embodiment, customer 190 may use electronic device 195, such as a smartphone, smartwatch, computer, Internet of Things (IoT) appliance, etc. to access a portal (not shown) for financial institution systems 150 using, for example, a browser, a computer program, a mobile application, etc.

In one embodiment, a dashboard may be provided to the customer to show how the financial institution may be using the customer's data internally, and what third parties have been granted access to the data. The customer may then adjust these settings as is necessary and/or desired.

Raw data storage 110 may store raw financial or other personal of confidential data for one or more customer. Data stored in raw data storage 110 may be encrypted. In embodiments, the raw customer data may be isolated from direct network access outside of financial institution systems 110 by, for example, broker 120. In embodiments, the data may be encrypted at all times (e.g., at rest and transit).

Raw data storage 110 may also store lifecycle events. For example, a financial institution has a wireless phone service provider as a partner. When customer 190 gets a new phone, this may be submitted as a life cycle event and may be delivered from the wireless provider and saved in raw data storage 110. This event may be used to predict customer 190's next purchase activity, and may provide offers to customer 190, or may be used to assist in decisioning with regard to the transaction approval.

After the life cycle event, if a questionable transaction involving the purchase of a new phone case is identified, the recent phone purchase event may be considered, and the transaction may be approved.

Broker 120 may collect and/or manage the data stored raw data storage 110. Broker 120 may be an individual, a system, etc. In one embodiment, broker 120 may interact with one or more internal data source (e.g., financial systems of record) to collect financial information for customers. Examples may include credit card databases, mortgage databases, banking databases, etc.

Broker 120 may also interact with one or more third party data source 170 to receive financial information about the customers. For example, the financial institution's system may use APIs, HTML screen scraping, file transfers, real time feeds, or any other suitable method.

Third party data source 170 may include any source that may store or maintain financial or confidential information for or about the customers. Examples may include third party financial companies (e.g., Intuit, mint.com, etc.), investment houses, other financial institutions, credit reporting agencies, clearinghouses, aggregators, partners (e.g., partner merchants, service providers, etc.).

In one embodiment, internal and external data stored in raw data storage 110, even if identical, may be physically separated.

Derived internal data store 130 may store data that has been processed for use by internal data users 145. For example, the data stored in raw data storage 110 may be scrubbed, tokenized, or otherwise manipulated to remove, replace, and/or mask some of the personal identifiable information. The data in derived internal data store 130 may accessed and/or used by internal data users 145, such as targeting systems, approval systems, decisioning systems, etc. Example systems include Originations, Risk, Fraud, etc. Access to internal systems is controlled to prevent data from leaking.

In one embodiment, internal institution data users 145 may be able to call internal customer data microservice 140, such as one or more API, or may have scrubbed/tokenized or score data delivered directly into their system for direct use during processing.

In embodiments, internal data users 145 may generate or derive scores or other factors from the raw data as a proxy for those values. For example, an item, such as a zip code, may be used in a mapping or an algorithm to create a simple score on the creditworthiness based on the customer's location. As another example, the last purchase amount made a group of defined retailers may be considered. Based on the transaction amount, the type of retailer, etc., a risk score for the next transaction may be generated.

Derived external data store 150 may include data that is encrypted, and scrubbed, tokenized, or otherwise manipulated to remove, replace, and/or mask personal identifiable information. In one embodiment, the data stored in derived external data store 150 may be prepared for use by external, third party data users 180.

Third party data users 180 may access derived external data store 150 using external customer data microservice 160, which may include one or more API.

In embodiments, internal data users may compare data for customer 190 to aggregated data for other customers, and may identify offers to be made based r customers fitting the same profile. In addition, trends may be identified in the information, and the customer may be informed of any identified trends. If the trend is a negative trend, customer 190 may be offered assistance to reverse the trend.

In one embodiment, data may be aggregated from more than one customer and may provide a view of a type of customer rather than raw customer data.

In one embodiment, the financial institution may use the customer data to authenticate customer 190 to or for third parties, to approve customer 190 for third party products on behalf of the third party, etc. For example, the financial institution may provide an authentication service that identifies a customer and guarantees this identity by providing insurance or other compensation if the identity is incorrect. This may be done using, for example, APIs, a light box (pop up web experience under the financial institution's control), via mobile, etc. The financial institution (or other service provider) may provide this service. The service may provide a consistent trusted identity that may be used by other applications, websites, etc.

In one embodiment, party seeking to authentication customer 190 may provide the customer data to the financial institution or authentication service, and the financial institution or authentication service may return an authentication confidence score. The score may be provided in any suitable manner, such as yes/no, red/amber/green, 0-10, etc.

Figure 2:
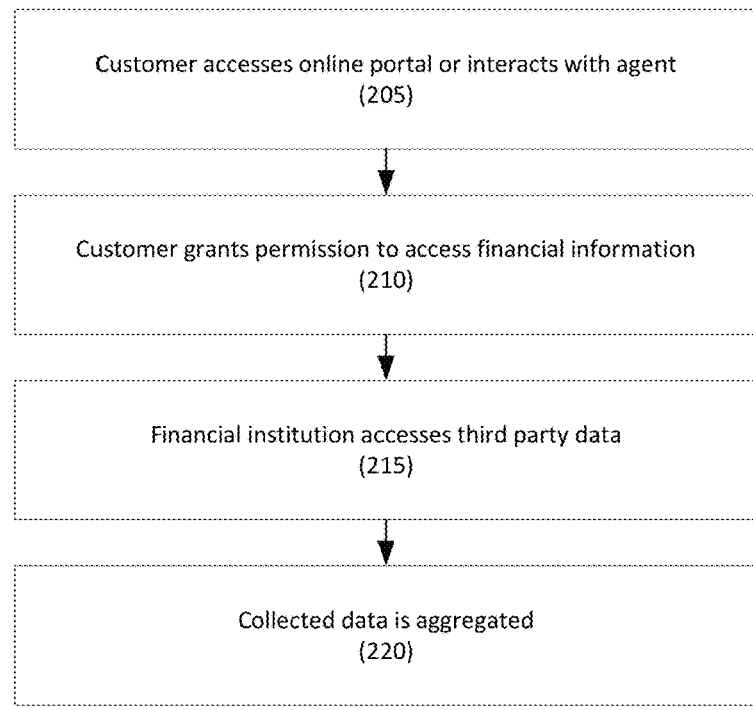
FIG. 2 depicts a method for collecting data for a secure digital safe deposit box according to one embodiment.

Referring to FIG. 2, a method for aggregating customer data in a digital safe deposit box is provided according to one embodiment. In step 205, a customer or prospective customer may access a financial institution's online portal, or may interact with a branch employee, or may complete an application for a financial product.

In step 210, the customer may grant permission to the financial institution to access the customer's financial or confidential information. In one embodiment, access to the stored customer financial or confidential data may be strictly controlled. For example, access to stored customer financial or confidential data may be limited to aggregated data. The stored customer financial or confidential data may be associated with an expiration data.

In one embodiment, the customer may interact with a digital account opening service, and may grant permission as part of this process.

In one embodiment, if not already provided, the customer may provide account information for accounts held with third parties that may hold financial, confidential, or personal information for the customer. The customer may provide login information as is necessary and/or desired, or may provide access to aggregated information.

Examples of third party sources include third party financial companies (e.g., Intuit, mint.com, etc.), investment houses, other financial institutions, credit reporting agencies, clearinghouses, aggregators, partners (e.g., partner merchants, service providers, etc.).

In one embodiment, OAUTH or a similar mechanism may be used to allow the financial institution and the third party to jointly authenticate the customer. Once authenticated, the financial institution may refresh the data on the customer's behalf without direct involvement from the customer.

In one embodiment, advisor-assisted enablement may involve the customer using a keypad or other device (e.g., a tablet computer) to securely provide authentication credentials to the third party. For example, the customer may log in using the device, and the authentication may be shared using a method that is similar to a SAML Assertion or other suitable method.

In one embodiment, a consent flow and a synchronization similar to OAUTH between the organizations may be provided. In another embodiment, a set of APIs may be used to retrieve the data. In still another embodiment, screen scraping may be used.

In embodiments, before the data is accessed, authentication may be required.

In step 220, the financial institution's systems may access the third-party data source to collect the customer's financial or confidential information. For example, the financial institution's system may use APIs, HTML screen scraping, file transfers, real time feeds, or any other suitable method to capture this information.

In one embodiment, the gathered data may be encrypted and stored as raw data. In one embodiment, internal data and external data may be stored separately. The raw data may be encrypted at rest and in transport.

Customers may be given an option on how their data may be used internally by the financial institution and externally by third parties. In one embodiment, the customer may receive a benefit, such as reward points, discounts, etc. for making their information available to third parties. An example of such is disclosed in U.S. patent application Ser. No. 15/935,720, and U.S. Provisional Patent Application Ser. No. 62/476,969, the disclosures of which are hereby incorporated, by reference, in their entireties.

Figure 3:
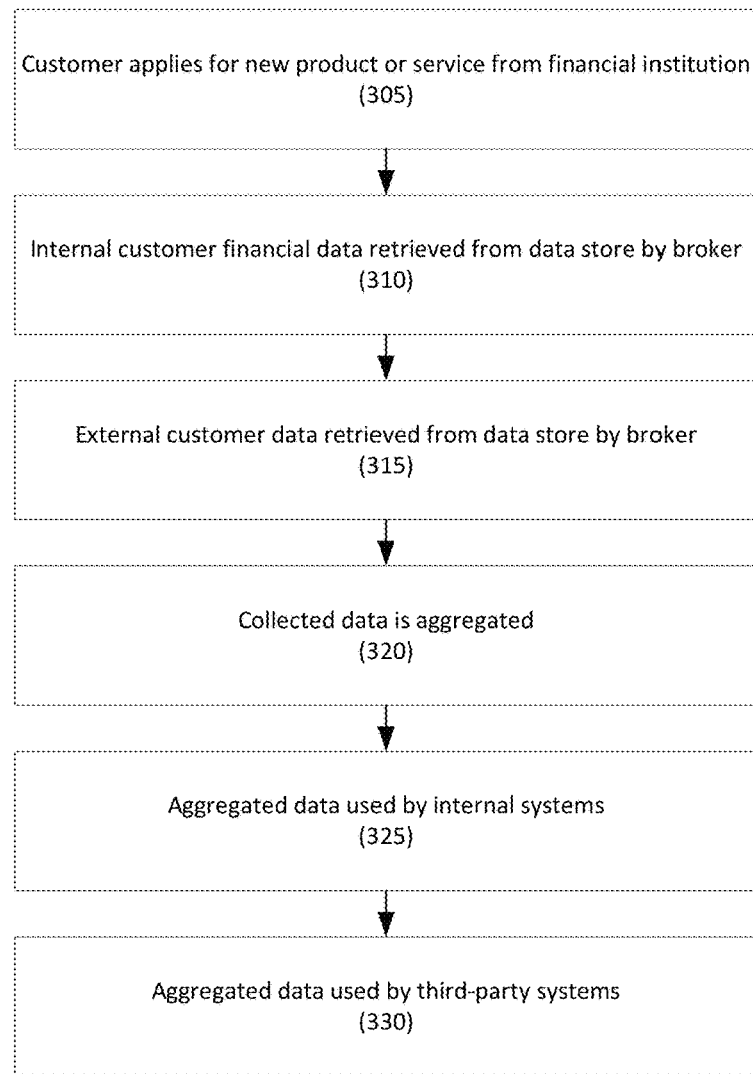
FIG. 3 depicts a method for use of information stored in a secure digital safe deposit box according to one embodiment.

Referring to FIG. 3, a method of using customer data with a digital safe deposit box is provided according to one embodiment. Once customer data is in the financial institution's systems, it may be used internally to enhance the decisioning process for and on behalf of the customer. Third parties may also have access to some or all of the data to enable and drive their processes.

For example, in step 305, a customer may apply for a new product or service from the financial institution. In one embodiment, existing account opening processes may be performed, such as completing an application, inferring asset information, etc.

In step 310, internal customer data may be retrieved and provided by the broker. For example, during the application process for new accounts, the data may be used to enhance the decision-making process and to assist the customer by, for example, pre-populating data fields where appropriate. For example, information on other accounts held by the customer with third parties may be retrieved.

In step 315, external customer data (e.g., from third parties) may be and provided by the broker. In one embodiment, the internal customer data and the third-party data may be retrieved and provided at the same time.

In step 320, the internal and external data for a plurality of customers may be aggregated. In one embodiment, aggregation may be used to provide a view of a type of customer to the third party rather than providing the raw customer data.

In step 325, the aggregated data may be used by internal systems proactively to enhance a customer's experience with existing products. This may include, for example, product/offer targeting, credit line increases, improved authorization decisions, etc.

In one embodiment, the raw data may be scrubbed, tokenized, or otherwise manipulated to remove, replace, and/or mask some of the personal identifiable information that is necessary for internal data users.

In one embodiment, the financial institution may use its algorithms to decision a customer. In another embodiment, the financial institution may use third party algorithms to decision a customer. In still another embodiment, a combination of in-house and third-party algorithms may be used.

In one embodiment, the algorithm may generate a simple score that may be used to approve the customer.

In embodiments, machine learning may be used to adjust the algorithms based on the customer data as well as data from similarly situated customers. For example, the data may be analyzed to identify customers that have similar patterns (e.g., spending), and then the data may be used to help validate questionable transactions based on the history of the similar customers. Thus, if the customer is in a group that has similar spending patterns (location, amounts, etc.), and the customer's transaction does not fit the customer's normal spending pattern, the patterns of the group may be considered to see if it fits one of the group's spending patterns.

In step 330, the aggregated data may be provided to and used by third party data users. In one embodiment, the raw data may be scrubbed, tokenized, or otherwise manipulated to remove, replace, and/or mask some of the personal identifiable information that is necessary for the third-party data users.

In one embodiment, the third-party data users may request the data (e.g., a data pull); in another embodiment, the customer may request that the data be provided to the third-party data user (e.g., a data push).

In one embodiment, restrictions may be placed on the data provided to third party data users. For example, before being provided with the data, the third party may be required to comply with certain restrictions on the data, such as keeping the data encrypted. In one embodiment, the encryption key used to encrypt the data may expire after a certain period of time, therefore limiting the lifetime of the data.

The disclosures of U.S. Provisional Patent Application Ser. No. 62/352,329, and U.S. patent application Ser. No. 15/627,678, are hereby incorporated, by reference, in their entireties.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for using customer data with a digital safe deposit box, comprising:
  receiving, by a computer program for a financial institution and from a customer, an application for a product or service;

retrieving, by the computer program and from an internal data source, internal financial or confidential information for the customer;

jointly authenticating, by the computer program and with a third party that holds third party financial or confidential information for the customer, the customer;

receiving, by the computer program and from the third party using an Application Programming Interface (API), Hypertext Markup Language (HTML) screen scraping, and/or and a real-time feed, the third party financial or confidential information for the customer;

generating, by the computer program, a score based on the internal financial or confidential information and the third party financial or confidential information using at least one algorithm; and decisioning, by the computer program, the customer based on the score.

2. The method of claim 1, wherein the internal financial or confidential information or the third party financial or confidential information comprises personally identifiable information.

3. The method of claim 1, further comprising:
adjusting the at least one algorithm based on the internal financial or confidential information and the third party financial or confidential information and financial or confidential information from at least one similarly-situated customer.

4. The method of claim 1, further comprising:
anonymizing, by the computer program, the internal financial or confidential information and the third party financial or confidential information; and
providing, by the computer program, the anonymized internal financial or confidential information and the third party financial or confidential information to an external party.

5. The method of claim 4, wherein the internal financial or confidential information and the third party financial or confidential information is anonymized by at least one of tokenizing, removing, or masking PII data.

6. The method of claim 1, further comprising:
aggregating, by the computer program, the internal financial or confidential information and the third party financial or confidential information for a plurality of customers; and
providing, by the computer program, the aggregated internal financial or confidential information and the third party financial or confidential information for the plurality of customers to an external party.

7. The method of claim 1, further comprising:
identifying, by the computer program, at least one product or service to offer the customer based on the internal financial or confidential information and the third party financial or confidential information for the customer.

8. The method of claim 1, wherein the internal financial or confidential information and the third party financial or confidential information is encrypted and stored as raw data.

9. The method of claim 1, wherein the third party financial or confidential information is associated with at least one restriction.

10. The method of claim 1, wherein the third party financial or confidential information expires.

11. A non-transitory computer readable storage medium, including instructions stored thereon, which when read and executed by one or more computer processors, cause the one or more computer processors to perform steps comprising:
receive, from a customer, an application for a product or service;

retrieve, from an internal data source, internal financial or confidential information for the customer;

receive, from a third party that holds third party financial or confidential information, third party financial or confidential information for the customer;

jointly authenticate the customer with a third party that holds third party financial or confidential information for the customer, receive, from the third party, the third party financial or confidential information for the customer from the third party, wherein the third party financial or confidential information is received from the third party using an Application Programming Interface (API), Hypertext Markup Language (HTML) screen scraping, and/or and a real-time feed;

generate a score based on the internal financial or confidential information and the third party financial or confidential information using at least one algorithm; and decision the customer based on the score.

12. The non-transitory computer readable storage medium of claim 11, wherein the internal financial or confidential information or the third party financial or confidential information comprises personally identifiable information.

13. The non-transitory computer readable storage medium of claim 11, further including instructions stored thereon, which when read and executed by one or more computer processors, cause the one or more computer processors to adjust the at least one algorithm based on the internal financial or confidential information and the third party financial or confidential information and financial or confidential information from at least one similarly-situated customer.

14. The non-transitory computer readable storage medium of claim 11, further including instructions stored thereon, which when read and executed by one or more computer processors, cause the one or more computer processors to:
anonymize the internal financial or confidential information and the third party financial or confidential information; and
provide the anonymized internal financial or confidential information and the third party financial or confidential information to an external party.

15. The non-transitory computer readable storage medium of claim 14, wherein the internal financial or confidential information and the third party financial or confidential information is anonymized by at least one of tokenizing, removing, or masking PII data.

16. The non-transitory computer readable storage medium of claim 11, further including instructions stored thereon, which when read and executed by one or more computer processors, cause the one or more computer processors to:
aggregate the internal financial or confidential information and the third party financial or confidential information for a plurality of customers; and
provide the aggregated internal financial or confidential information and the third party financial or confidential information for the plurality of customers to an external party.

17. The non-transitory computer readable storage medium of claim 11, further including instructions stored thereon, which when read and executed by one or more computer processors, cause the one or more computer processors to identify at least one product or service to offer the customer based on the internal financial or confidential information and the third party financial or confidential information for the customer.

18. The non-transitory computer readable storage medium of claim 11, wherein the internal financial or confidential information and the third party financial or confidential information is encrypted and stored as raw data.

19. The non-transitory computer readable storage medium of claim 11, wherein the third party financial or confidential information is associated with at least one restriction.

20. The non-transitory computer readable storage medium of claim 11, wherein the third party financial or confidential information expires.

\* \* \* \* \*